(12) United States Patent
Collins et al.

(10) Patent No.: US 7,636,456 B2
(45) Date of Patent: Dec. 22, 2009

(54) SELECTIVELY DISPLAYING INFORMATION BASED ON FACE DETECTION

(75) Inventors: Andrew Collins, Basingstoke (GB); Andrew Roger Kilner, Basingstoke (GB); Victoria Sophia Jennings, Basingstoke (GB); Sebastian Aleksander Paszkowicz, Coventry (GB); Eric Rudolf Siereveld, Gorinchem (NL); Stephane Daniel Andre Charles Labrousse, Camberley (GB); Robert Mark Stefan Porter, Winchester (GB); Ratna Rambaruth, Guildford (GB); Clive Henry Gillard, Alton (GB)

(73) Assignee: Sony United Kingdom Limited, Weybridge (GB)

( * ) Notice: Subject to any disclaimer, the term of this patent is extended or adjusted under 35 U.S.C. 154(b) by 799 days.

(21) Appl. No.: 11/040,552

(22) Filed: Jan. 21, 2005

(65) Prior Publication Data
US 2005/0198661 A1 Sep. 8, 2005

(30) Foreign Application Priority Data
Jan. 23, 2004 (GB) .................................. 0401490.8

(51) Int. Cl.
*G06K 9/00* (2006.01)
*H04H 60/56* (2008.01)
*H04N 5/445* (2006.01)

(52) U.S. Cl. ..................... 382/118; 725/12; 725/42; 725/46

(58) Field of Classification Search ............ 725/12, 725/42, 46; 382/118
See application file for complete search history.

(56) References Cited

U.S. PATENT DOCUMENTS

| | | | |
|---|---|---|---|
| 5,781,650 A * | 7/1998 | Lobo et al. ............. | 382/118 |
| 5,966,696 A | 10/1999 | Giraud | |
| 6,873,710 B1 * | 3/2005 | Cohen-Solal et al. ..... | 382/100 |
| 7,174,029 B2 * | 2/2007 | Agostinelli et al. ....... | 382/100 |
| 7,251,350 B2 * | 7/2007 | Tsirkel et al. ............ | 382/118 |
| 7,257,239 B2 * | 8/2007 | Rowe et al. ............. | 382/118 |
| 2002/0072952 A1 | 6/2002 | Hamzy et al. | |
| 2003/0083932 A1* | 5/2003 | Wolf et al. .............. | 705/14 |
| 2003/0088832 A1* | 5/2003 | Agostinelli et al. ....... | 715/526 |
| 2004/0037469 A1 | 2/2004 | Werner et al. | |

FOREIGN PATENT DOCUMENTS

WO WO 01/45004 A1 6/2001
WO WO 01/93230 12/2001

* cited by examiner

*Primary Examiner*—Bhavesh M Mehta
*Assistant Examiner*—Soo Jin Park
(74) *Attorney, Agent, or Firm*—Oblon, Spivak, McClelland, Maier & Neustadt, L.L.P.

(57) ABSTRACT

A display arrangement comprises an image display device having two or more sets of images for display; a camera directed towards positions adopted by users viewing the display; a face detector for detecting human faces in images captured by the camera, the face detector being arranged to detect faces in at least two face categories; and means, responsive to the a frequency of detection of categories of faces by the face detector at one or more different periods, for selecting a set of images to be displayed on the image display device at that time of day.

15 Claims, 11 Drawing Sheets

SELECTIVELY DISPLAYING INFORMATION BASED ON FACE DETECTION

BACKGROUND OF THE INVENTION

1. Field of the Invention

This invention relates to displays.

2. Description of the Prior Art

Electronic displays are commonly used in shops and other public areas to carry advertising material and the like. Such an arrangement may be referred to as "digital signage".

A common arrangement is for a television monitor and video player (e.g. a VHS cassette tape player) to play out material encouraging shoppers to buy goods laid out near to the television monitor. A more advanced arrangement is provided by, for example, the Sony ® NSP100™ digital playout system. This device is a networked playout device which receives video (and, optionally, audio) material and a playout schedule over a digital network, and then plays out the video and audio material on a display device at times indicated by the schedule.

While these arrangements provide a degree of user control over the material played out—for example, the user can select a tape cassette or can load desired material onto the NSP100 playout system—it is relatively difficult to tailor the displayed material to best suit a current audience.

WO 01/45004 and U.S. Pat. No. 5,966,696 disclose digital signage arrangements which use a detection of the audience to affect the material played out. In U.S. Pat. No. 5,966,696, proximity detectors are used to detect the presence of a viewer at a display screen, which causes the display screen to be switched from an idle to an active mode. WO 01/45004 purports to use a detection of certain characteristics of a viewer in front of a display screen to control the selection of material to be played out at that display screen.

SUMMARY OF THE INVENTION

This invention provides a display arrangement comprising:

an image display device having two or more sets of images for display;

a camera directed towards positions adopted by users viewing the display;

a face detector for detecting human faces in images captured by the camera, the face detector being arranged to detect faces in at least two face categories; and means, responsive to the a frequency of detection of categories of faces by the face detector in respect of one or more different periods, for selecting a set of images to be displayed on the image display device at that period.

The invention provides an improvement on the previously proposed digital signage arrangements by displaying images (e.g. advertising content) in dependence on statistics gathered at different periods (e.g. times of the day), rather than necessarily in response to an individual face being detected. This provides a less disruptive playout of material on the display device.

Various other respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
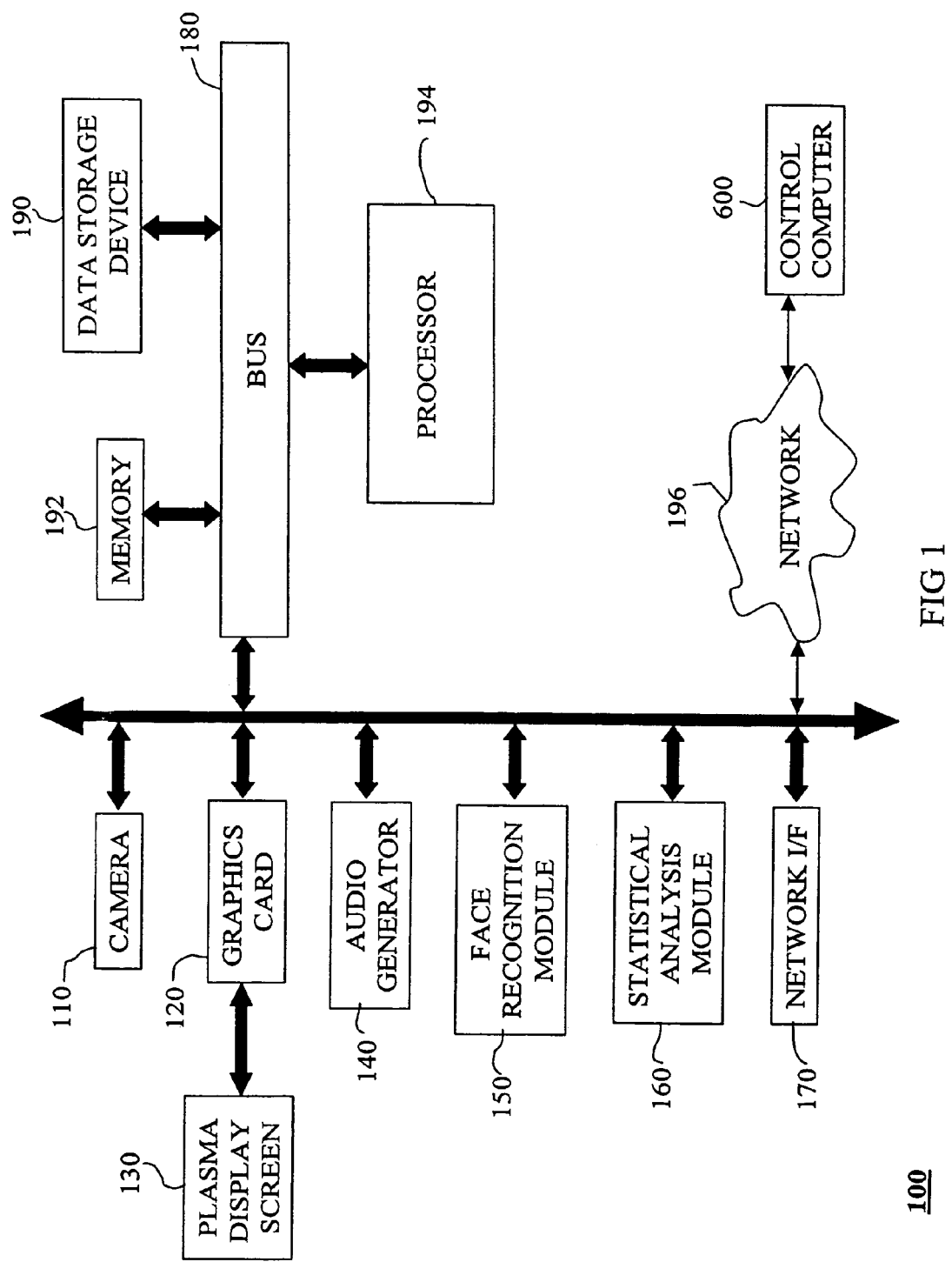
FIG. 1 schematically illustrates a display arrangement according to the present technique.

FIG. 1 schematically illustrates a display arrangement according to the present technique. The display arrangement is located at a predetermined position in a store (shop), mounted on a shelf amongst products displayed for sale. The display arrangement 100 comprises: a camera 110; a graphics card 120; a plasma display screen 130 (of course, other types of display could be used); an audio generator 140; a face detection/recognition module 150; a statistical analysis module 160; a network interface 170; a communication bus 180; a data storage device 190; local memory 192 and a processor 194. The display device is connected to a network of such devices through a communications network 196. A control computer 600 communicates with the display arrangement 100 via the network 196.

In the description which follows it will be appreciated that various parts may operate wholly or partly under software control. Such software may be supplied by a recording medium (e.g. an optical disk medium), a network or internet connection, or other providing medium.

The camera 110 is integral to the mounting of the plasma display screen 130 and is used to capture images of human faces as they view the display screen. The captured video images are analysed to detect human faces and to perform facial recognition analyses. The camera 110 is discreetly mounted, perhaps in a frame of the display, so as not to distract the viewer's attention from the promotional display presentation comprising advertising images for products or services available and so as not to inhibit a viewer's normal reaction to the displayed material.

The plasma screen 130 is driven by the graphics card 120 and presents display information from a selection of possible promotional display sequences stored on the data storage device 190. The processor 194 is (or is based on) a Sony® NSP100™ processor and is operable to control download of display sequences via the network 196. The basic NSP100 processor generally operates in a "push" mode, which is to say that it receives content pushed to it by a server, and displays that content. Here, the processor 194 can also operate in a "pull" mode by which it requests or downloads appropriate content for display, for example in dependence on the nature of the viewing audience.

The control computer 600 can configure the local display arrangement, the particular configuration determining the selectable range of display sequences available at the particular plasma display screen 130.

The graphics card 120 comprises an MPEG (or a proprietary format used in the NSP100) decoding unit that facilitates display of stored MPEG format display material on the plasma screen.

The audio generator 140 co-operates with the graphics card to produce sound effects for the promotional display sequence. The sound effects may be reproduced either with an MPEG video sequence or independently, as required for a particular application.

The face detection/recognition module 150 comprises face detection software to identify the presence of human faces that appear within a predetermined spatial range of the camera (and associated display screen) and face recognition software. The face recognition software is operable to recognise individual faces previously detected at the same camera, at other camera locations or stored within a database of detected faces. The face detection algorithm works by analysing the field of view for shapes that could be human faces and searching for matches of features of a detected object with template facial features stored in memory. Facial movements such as eye-blinks and mouth movements can also be used to determine whether face-like objects indeed correspond to human faces.

A set of characteristic facial parameters is established by analysis of the colour darkness levels of image pixels. Facial features such as eyes, eyebrows, cheekbones and noses can be identified by searching for abrupt changes in darkness levels across adjacent image regions. Colour histograms of image pixels can be used to detect skin tone and hair colour. A plurality of anchor points on a detected face can be defined to provide a representation of facial bone structure. The anchor points are determined from changes in darkness levels. The anchor points typically include the corners of the mouth, points on the brow line, cheek bones and points corresponding to the bridge and the tip of the nose. The anchor points are joined to form a mesh of triangles and the angles of each triangle are used as a characteristic set of facial parameters that can be used to match similar detected faces and thus to perform facial recognition analysis.

In an alternative arrangement, a so-called eigenface method of face recognition is used. According to the eigenface method the face as a whole is examined, rather than local facial features. A database of detected faces is first analysed to define a composite face and each newly detected face is compared as a whole to the composite face. A numerical value specifying differences between a detected face and the composite face is used as the characteristic facial parameter data.

It will be appreciated that in many automated face detection, recognition, correlation and/or characterising systems, the detection, correlation or recognition of a face is based on a statistical process involving the detection of a likelihood that a face is present or that a certain face is the same as another face etc. The likelihoods can be compared with a threshold probability so as to give what appears to be a definite "yes/no" result, but underlying that result is the statistical process described above. In the present description it is understood that this may be the nature of the face processing that takes place, so the skilled man will of course appreciate that references to the detection of a certain parameter (e.g. an expression category) relate to a detection that this is the most likely category, or that this is a category which exceeds a threshold probability, or the like.

The statistical analysis module 160 maintains cumulative statistical data on the human faces detected locally by the camera 110 including a headcount of distinct faces, gender data, age category data and time spent by each detected face within a predetermined spatial range of the plasma display screen 130 (i.e. the in-shot time). The face detection/recognition module 150 is operable to detect both the in-shot time of each human face and the dwell time, which is the time for which the detected human face directly views (i.e. is oriented directly towards) the display screen 130. A cumulative dwell time may also be recorded. The cumulative dwell time represents the total time spent either by all detected faces within a given time period or by a predetermined category of detected faces (e.g. male faces or children's faces) directed towards the display screen associated with the particular camera). Alternatively, a cumulative dwell time can be calculated for a given face ID or for a given category of faces such that it represents the total dwell time at a plurality of different display screens/cameras at different locations in the network. The local memory 192 is available for local data processing and for storage of a limited quantity of local statistical data prior to the downloading of that data for a global statistical analysis by the control computer 600.

It will be appreciated that display technologies other than plasma screens can be used. It will also be appreciated that within the context of a store-wide network, the skilled person can select which processing operations should take place at a display terminal and which should take place at one or more central servers. Indeed, some operations may take place at both, depending on the nature of the operation. For example, some statistical operations used to determine which content should be displayed may be best carried out quickly and locally at the terminal. A more detailed analysis of the same information, for example to harvest data for marketing advertising space on the displays, could be carried out at a server.

Figure 2:
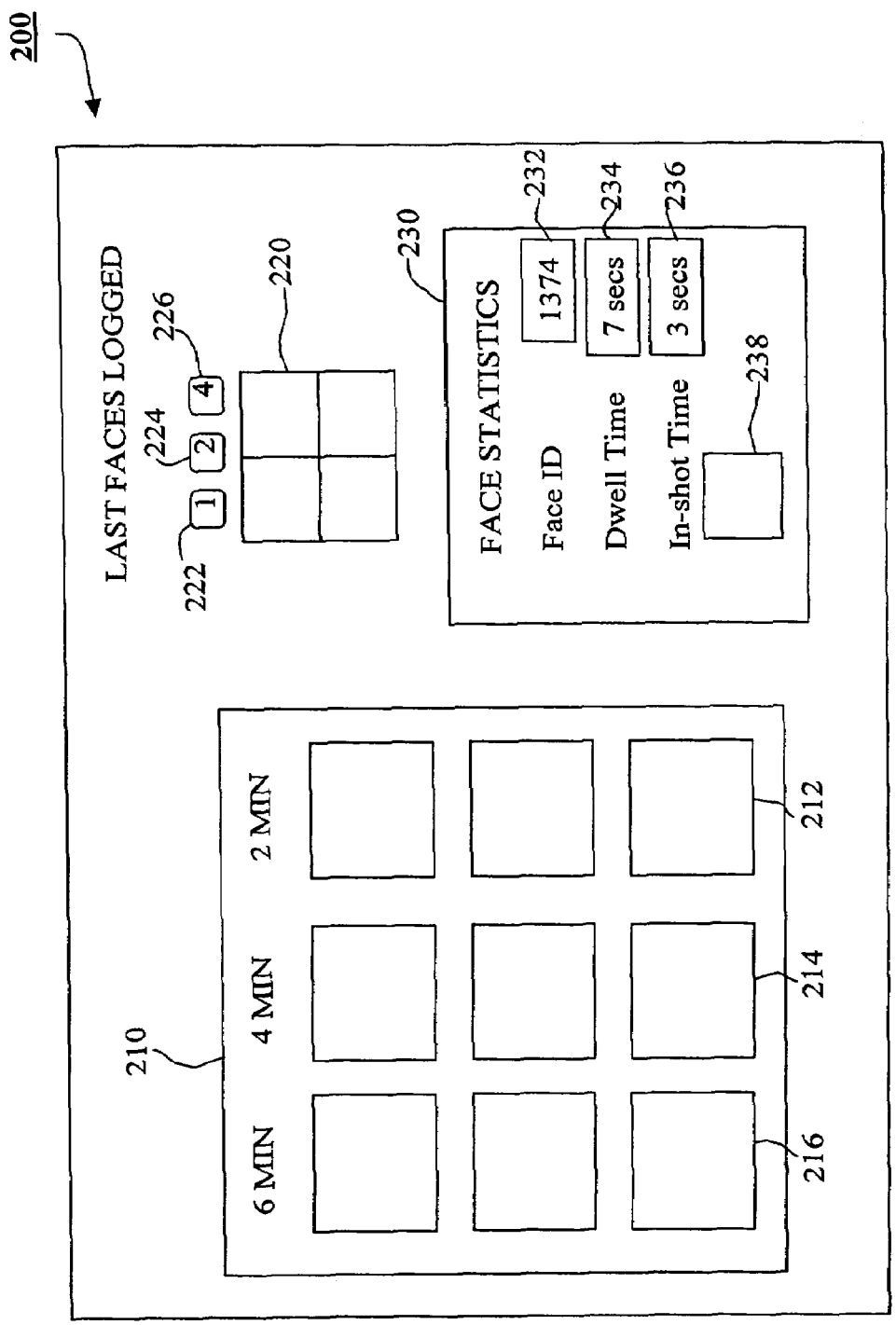
FIG. 2 schematically illustrates a graphical user interface for displaying information captured by a camera and associated face detector at a specific location.

FIG. 2 schematically illustrates a graphical user interface (GUI) for displaying information captured by a camera and associated face detector at a specific location. The GUI 200 comprises a grid 210 of recently detected faces. Representative keystamp images of the detected human faces appear to the right of the grid at position 212 and progress to the left through positions 214 and 216 as time elapses. In this particular arrangement a representative keystamp is created from a given image sequence by performing a colour histogram analysis of the pixel data of each image frame, determining an averaged colour histogram and selecting as the representative keystamp an image from the sequence that is close in content to the averaged colour histogram.

The images at 212 were captured two minutes ago; the images at 214 were captured four minutes ago and the images at 216 were captured 6 minutes ago as indicated by the grid column headings. Each row of the grid represents images presented to a given camera 110. A GUI panel 220 is used to display a number of most recently logged faces. The number of faces displayed in this GUI panel is selectable by a user highlighting the appropriate button 222, 224, or 226 on the display screen corresponding respectively to one, two and four images. The GUI 200 also comprises a face statistics panel 230 associated with a user-selected one of the representative keystamp images displayed in the recently logged faces GUI panel 220. A representative keystamp image 238 with which the statistics are associated is also displayed within the face statistics panel 230. In this example arrangement the statistics displayed are a face ID 232, a cumulative dwell time 234 of detected faces at the given camera, which in this example is seven seconds and the in-shot time 236, which is three seconds. The cumulative dwell time in this case represents the cumulative time spent by all detected faces (of any category) oriented directly towards the plasma display screen.

Figure 3:
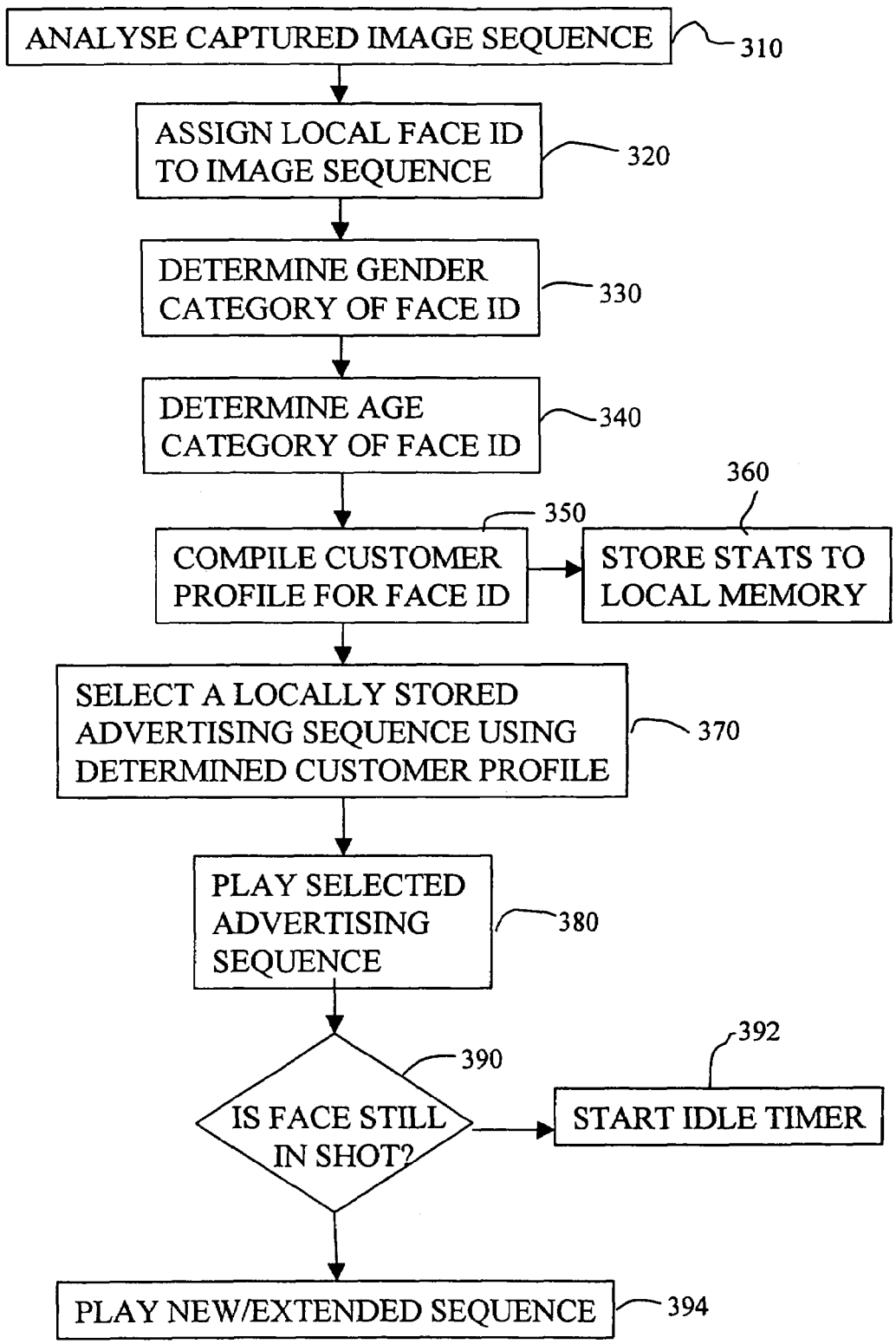
FIG. 3 is a flow chart that schematically illustrates how a set of images to be displayed is selected in dependence upon the category of face detected by a face detector.

FIG. 3 is a flow chart that schematically illustrates how a set of images to be displayed is selected in dependence upon the category of face detected by the face detection/recognition module 150.

At a stage 310 a captured image sequence is analysed locally by the face detection/recognition module 150. The analysis may be at least partially performed before image capture associated with the detected face has terminated.

At a stage 320 a local face ID is assigned to the captured image sequence (or to one face in the sequence) in dependence upon predetermined characteristics of the detected human face.

Next, at a stage 330, the statistical analysis module 160 determines the gender category (i.e. male/female) of the detected face based on information derived from the face detection/recognition module 150 and at a stage 340 the detected face is placed in one of a number of predetermined or variable age categories: such as child; adolescent; working-age adult; retired adult. In general, the age categories may well be decided by the marketing requirements of the products on sale. The age category may be determined by the face detection/recognition module 150 from an analysis of the skin tone/texture, hair colour and the relative proportions of the facial features.

At a stage 350, the gender category and age category associated with the local face ID and additional information including the current day and time, the in-shot time and dwell time are assimilated as a customer profile and this information is stored to local memory 192 (and optionally to remote memory) at a stage 360.

In alternative arrangements additional information such as ethnic origin, specific physical characteristics and categories of emotional expressions can be used to establish or augment the customer profile.

Next, at a stage 370, one of a plurality of locally stored promotional sequences is selected for display on the plasma screen 130 in dependence upon the customer profile that was determined at the stage 350. The promotional sequence is selected such that it is specifically targeted at the particular customer profile.

At a stage 380 the selected promotional display sequence and any accompanying audio data are retrieved from the local data storage device 190, decoded by the graphics card 120 and the audio generator and presented to the customer using the plasma display screen 130.

At a stage 390, when the selected advertising sequence has been displayed once from beginning to end, it is detected via the camera 110 and face detection/recognition module 150 whether the same human face is still in shot. If not, and no other face is detected in shot then an idle timer is triggered at a stage 392 to monitor the time elapsed between detection of individual human faces. However, if the human face having the same face ID allocated at the stage 320 is still in shot at the stage 390 then the process proceeds to a stage 394 whereupon either an extended advertising sequence directed to the same product as the initial advertising sequence is displayed, or a newly selected promotional sequence that is also appropriate to the customer profile is displayed on the plasma screen 130.

Figure 4:
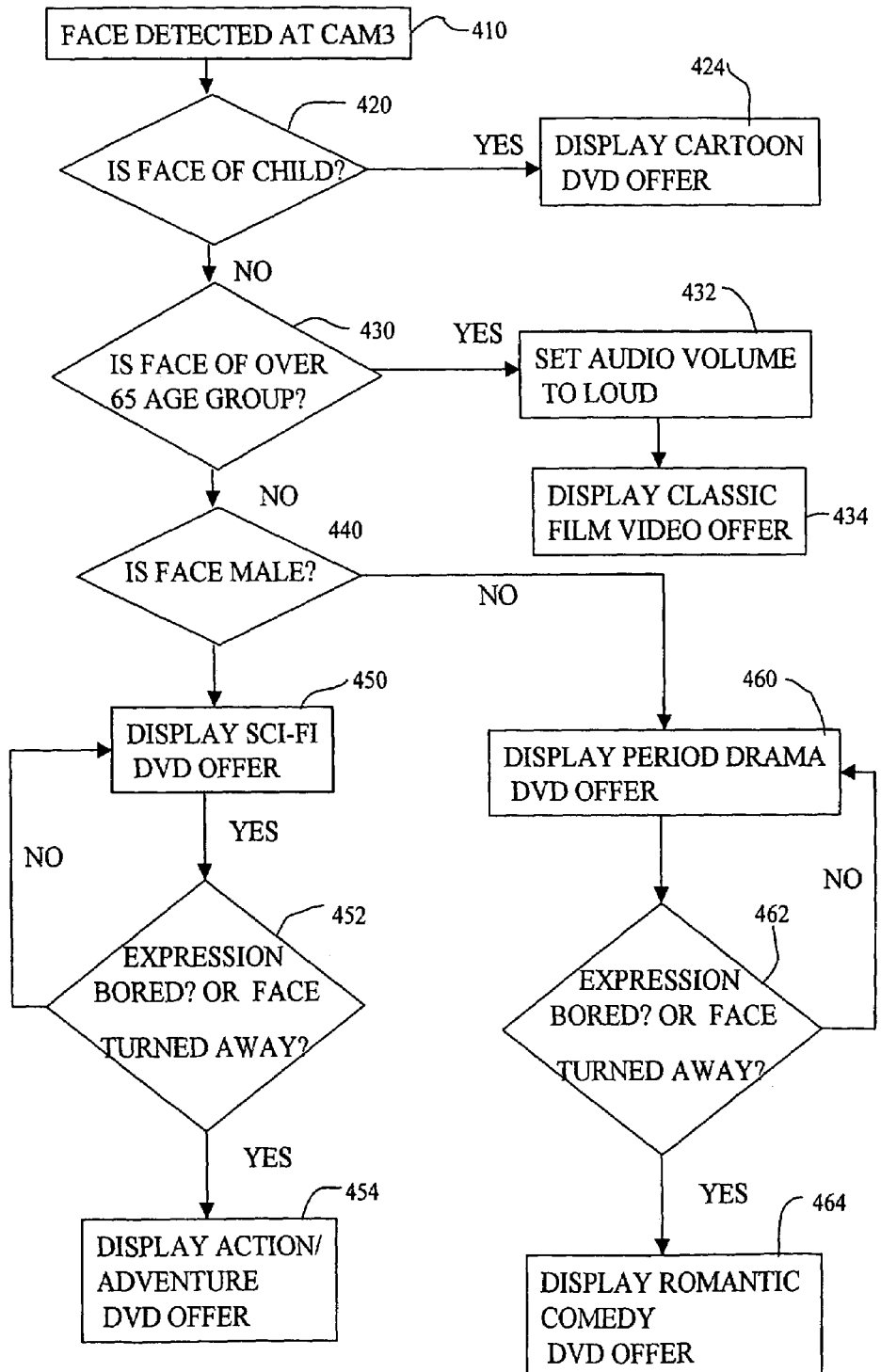
FIG. 4 is a flow chart that schematically illustrates how a particular set of images is displayed in dependence upon the age, gender and facial expression category of a detected face.

FIG. 4 is a flow chart that schematically illustrates an example of how a particular set of images is selected and displayed in dependence upon the age, gender and facial expression category of a detected face.

At a stage 410 a face is detected by a camera, which is associated with a plasma display screen 110 located in the audio/video sales section of the store.

At a stage 420 the face detection/recognition module determines if the detected face is the face of a child and, if so, displays a promotion for a cartoon digital video disc (DVD) offer. However, if at the stage 420 it is determined that the detected face does not belong to a child the process proceeds to a stage 430, where the face detection/recognition module determines whether the detected face is likely to belong to the over sixty-five age group. If the face is in fact categorised as over sixty-five then the audio generator 140 is controlled to set a louder than normal audio volume at a stage 432 and subsequently at a stage 434 a classic film video promotional sequence is displayed on the plasma screen 110.

If at the stage 430 it is determined that the detected face does not belong to the over sixty-five age group then it is determined at a stage 440 whether or not the detected face is male. If the face is in fact male the process proceeds to a stage 450 whereupon a science-fiction DVD offer is displayed on the plasma screen 130. During display of the science-fiction promotional sequence, the camera 110 continues to monitor (at a stage 452) the male face and determines whether the facial expression can be categorised as one of boredom at any point during the display of the promotional material or whether the detected face changes orientation such that it is no longer directly viewing the display screen. If no such detection is made then the sci-fi DVD promotion continues to be displayed to the customer. However, if a bored face is in fact detected or if the face turns away from the display by more than a predetermined angle then the process proceeds to a stage 454 and a different promotional sequence is displayed on the display screen, in this case a promotion for an action/adventure DVD offer, in an attempt to regain the attention of the viewer and increase the cumulative dwell time.

If at a stage 440, the detected face was determined to be female then at a stage 460 a period drama DVD promotional sequence is launched on the plasma display screen 130. During display of the period drama promotional sequence, the camera 110 continues to monitor (at a stage 462) the female face and determines whether the facial expression can be categorised as one of boredom at any point or whether the detected face begins to change orientation such that it is no longer directly viewing the display screen. If no such detection is made then the period drama promotion continues to be displayed to the female customer. However, if a bored face is in fact detected or if the face turns away from the display screen then the process proceeds to stage 464 and a promotional sequence for a romantic comedy DVD is instead presented on the plasma display screen 130.

The flow chart of FIG. 4 relates to promotion of products but it will be appreciated that advertisements for services such as financial services could alternatively be displayed on the plasma display screens. Furthermore, rather than selecting the promotional display according to the detected characteristics of an individual customer, data from the statistical analysis module 160 could be used to determine the frequency of detection of faces in a particular age or gender category over a predetermined time interval and a promotional sequence could be selected in dependence upon the relative frequencies of detected faces in the different categories. This can take place over respective time periods (e.g. each thirty seconds, or each five minutes, or over variable time periods delineated by a change in the face distribution greater than a threshold change) so as to provide means, responsive to the a frequency of detection of categories of faces by the face detector at one or more different periods, for selecting a set of images to be displayed on the image display device in respect of that period. Alternatively, the time periods could be rolling, so that at any time, for example, the displayed material is based on face categories during a most recent thirty seconds. Alternatively, a historical database of detected faces could be used to determine the most likely category of customer to be present in the store on a given day of the week at a given time (or fixed or variable time period) and the displayed promotional sequences could be selected accordingly. In all these cases, the selection of images for display in a time period corresponds to the most frequently occurring category (or group of categories, where multiple types of images can be displayed in the period) in respect of that time period.

Figure 5:
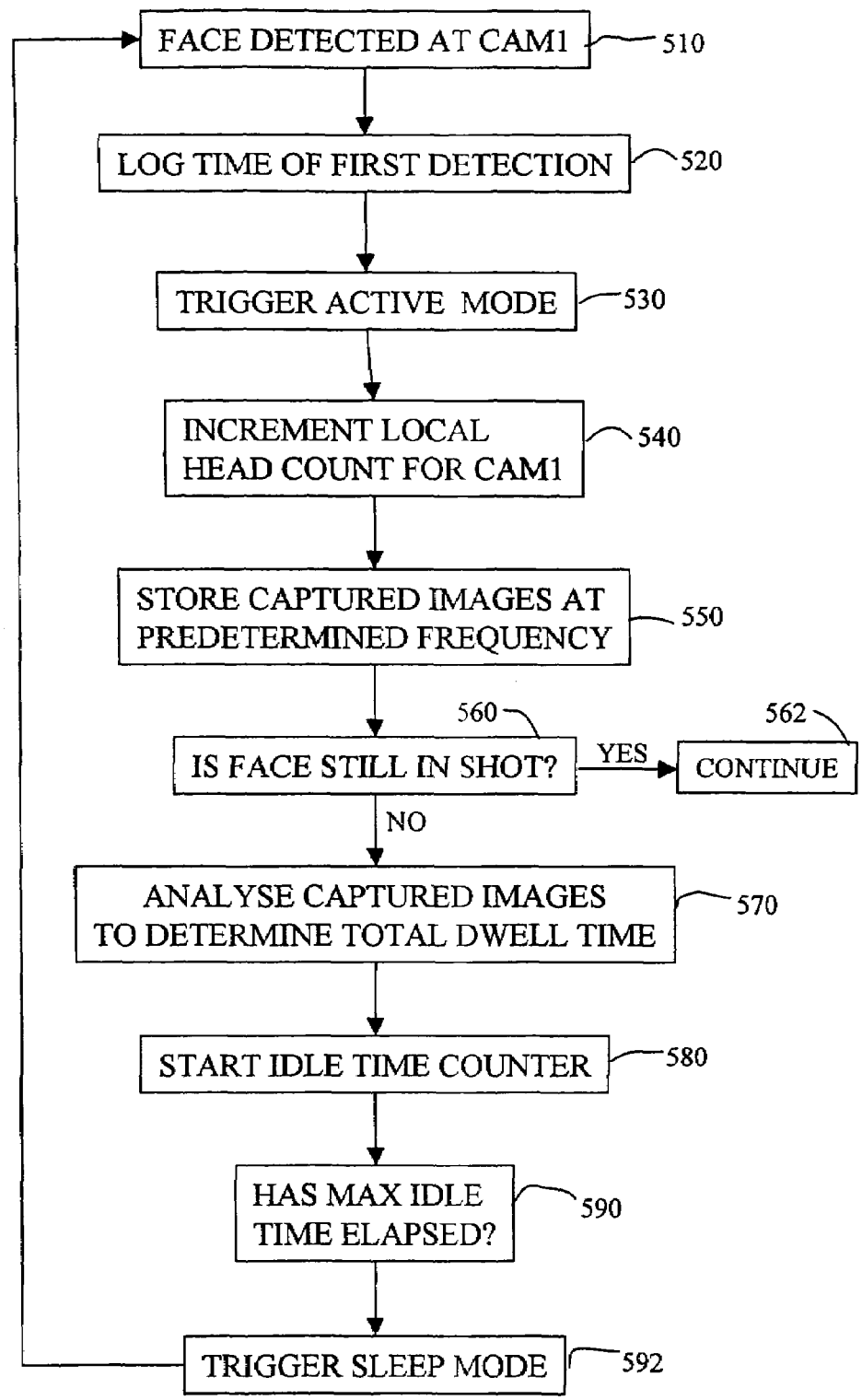
FIG. 5 is a flow chart that schematically illustrates how the display arrangement of FIG. 1 is controlled to transition between an idle mode and an active mode in dependence upon output of the face detector.

FIG. 5 is a flow chart that schematically illustrates how the display arrangement of FIG. 1 is controlled to transition between an idle mode and an active mode in dependence upon output of the face detection/recognition module 150.

The display screen 130 is initially in an inactive mode, which is a power-saving state but the camera 110 and face detection/recognition module 150 are still powered-up and fully operational. At stage a 510 the face detection/recognition module detects the presence of a human face at camera 1 and at a stage 520 the statistical analysis module 160 logs the time of first detection of the human face.

At a stage 530 the processor 194 sends a control signal to the plasma display screen 130 to initiate an active mode in which full power is supplied to the screen and display of a promotional image/audio sequence is initiated.

At a stage 540 the statistics analysis module 160 increments the local head count for camera 1. Prior to incrementing the local head count a cross-check is performed, by the face detection/recognition module 150, of recently detected faces to determine if the currently detected face has been recently logged at the same camera and, if this is the case, then the local head count is not incremented. The time window over which this cross-check is performed in this particular arrangement is a 2 hour period, but the period is configurable by an operator via the control computer 600.

At a stage 550, a subset of images of the human face captured by the camera is stored either in the memory 192 or on the data storage device 190 for subsequent viewing and/or analysis. The images are captured at a predetermined frequency and quality that is set in dependence upon the available storage capacity.

At a stage 560 the face detection/recognition module 150 determines whether or not the human face is still in shot. If the face is determined to be still in shot then the image capture continues at a stage 562. However, if it is determined that the human face is not in shot then an in-shot timer is stopped and at a stage 570 the captured image sequence is analysed by the face detection/recognition module 570 to detect the total dwell time of the identified human face at camera 1. The total dwell time is the time that the face was oriented directly towards the camera (within a given tolerance margin) and hence the display screen.

At a stage 570 the cumulative dwell time (for customers of all face categories) is also incremented to include the dwell time of the currently detected face. At a stage 580, when it has been determined that the human face is no longer in shot of camera one and that no other human face is in shot, an idle time counter is started. While the idle time counter is running it is determined whether the maximum idle time, which in this case is set to be five minutes, has elapsed. During this time the display screen remains in active mode, but displays a static image rather than an animated sequence. When the idle time exceeds the maximum idle time without a further human face having been detected by the face detection/recognition module 150, the processor 194 powers down the plasma display screen into an inactive mode at a stage 592 to reduce power consumption.

In this arrangement the idle time counter begins to count as soon as it is determined that there is no human face in shot, but in alternative arrangements (such as that described above with reference to FIG. 3) the idle time counter could be started only at the end of a given promotional sequence if it is determined at that stage that a human face is no longer in shot.

Figure 6:
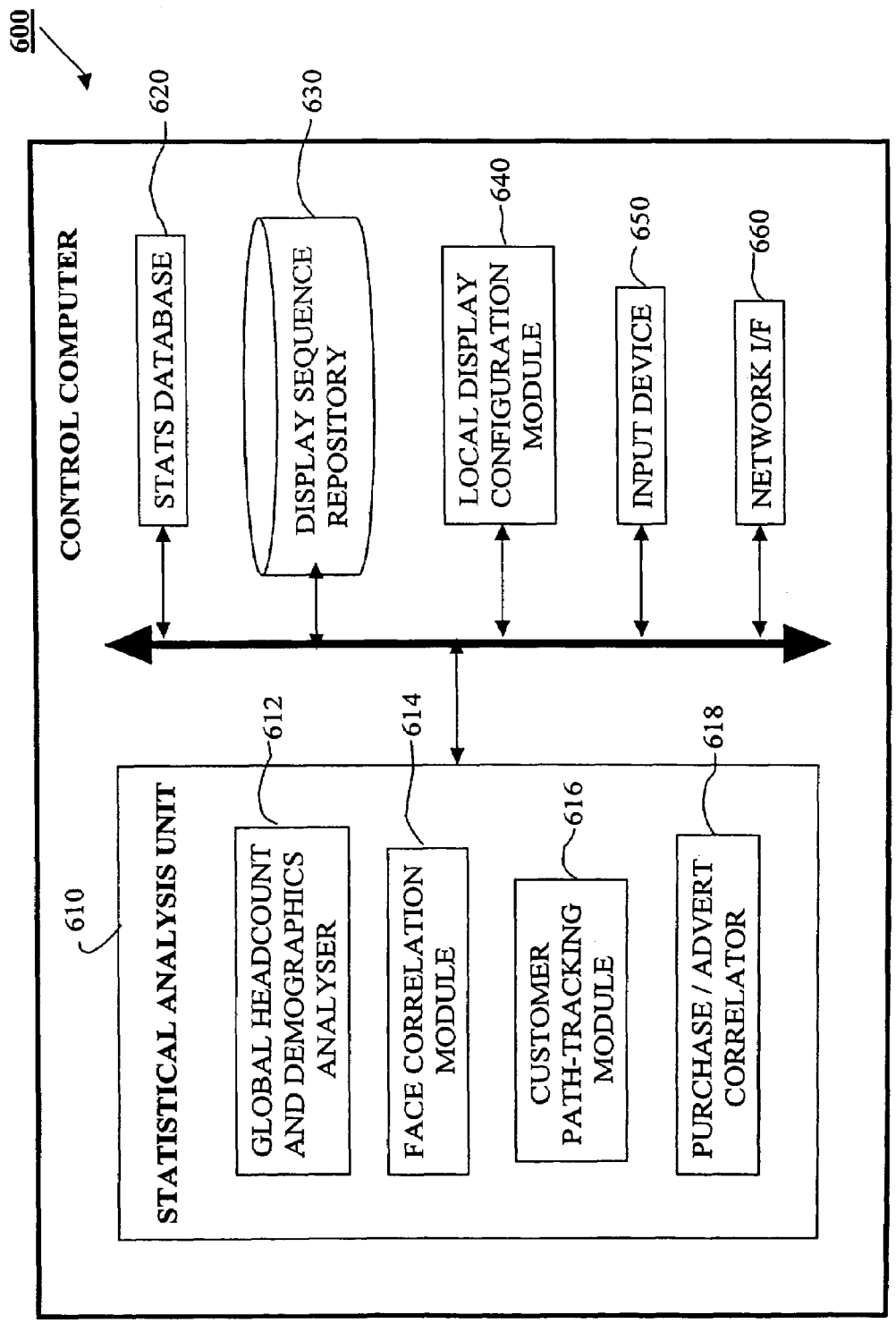
FIG. 6 schematically illustrates the components of a control computer that controls a plurality of networked display devices.

FIG. 6 schematically illustrates the components of a control computer 600 that controls a plurality of networked display devices. The control computer collates and analyses statistical information downloaded from each of the local display arrangements located throughout the store. It will be appreciated that the statistical analysis will be (or could be) at least partially performed locally at individual display arrangements using individual face detection/recognition modules 150 and statistical analysis modules 160.

In this particular arrangement a control computer 600 is provided to collate statistics from individual cameras, to store a historical database of detected faces and to perform an overall statistical analysis of detected human faces at the plurality of locations. Alternative arrangements perform the overall analysis in a distributed manner without the need for a control computer 600, for example using a "grid" type computer system.

The control computer comprises: a statistical analysis unit 610 having a global headcount and demographics analyser 612, a face correlation module 614, a customer path-tracking module and a purchase/advert correlator; a statistics database 620; a display sequence repository 630; a local display configuration module 640; an input device 650 and a network interface 660 which, amongst other functions, can provide access to a remote storage facility.

The control computer 600 is operable to download stored statistics associated with local display screens and associated cameras across the network 196 and to collate and analyse those statistics before storing them in the statistics database 620. The statistics database 620 stores data covering a longer timespan (in this example statistics for the full year) than the statistics stored locally in memory 192 at the display screens. Representative keystamp images and a characteristic set of image parameters for each detected face are also stored in memory at the control computer. The display sequence repository 630 stores a plurality of different promotional display sequences for selective downloading to individual plasma display screens. The local display configuration module 640 enables configuration of each local display, either automatically under the control of a software program or manually by an operator of the control computer using the input device 650.

In the statistical analysis unit 610, the global headcount and demographics analyser 612 collates headcount statistics from each of the local display arrangements thus provides a comparison of the number of viewers attracted to each display (see the description of FIG. 8 below). The headcount at each display arrangement will depend on the location of the display screen 130 in the store as well as on the promotional sequences actually displayed. Other demographics such as the total number of detected faces in a given age category or gender category are also collated by the global headcount and demographics analyser 612.

The face correlation module 616 collates data on the local face IDs from individual local display arrangements and performs comparisons of characteristic face parameters determined by the face detection/recognition module 150 to determine matches for a given detected face between different cameras. Accordingly, local face IDs are correlated and assigned a global face ID where a match is found for a given face at two or more cameras. For a given global face ID, detection times and dwell times at each different camera are collated to track the progress of a given customer through the store and to establish the time spent viewing each display screen. This information is used by the customer path-tracking module 616 to determine the most likely paths through the store taken by a given subset of consumers on a given day of the week and at a given time of day, or at a given season, or in a particular purchasing "environment"—such as during a major sporting event, on a rainy afternoon, on a summers day etc (see description of FIG. 9 below).

Furthermore, for each set (or at least some sets) of advertising or promotional material, data are stored indicating the viewers' facial expressions while watching the material. While this information can be at least approximated by automatic detection (in which case all that needs to be stored in association with a set of advertising material is simple data representing "interested", "bored" or other expression category. The data can be averaged over all users, or over randomly chosen users or other selections of users (e.g. those who went on to purchase a related item). The data can represent the users' expression category over time during the period of viewing, for example with a sample every ten seconds of viewing. The data can be correlated against the particular point in the displayed material at which the expression category was sampled.

The purchase/advert correlator 618 links purchases of products promoted on the display screens to viewing events at the plasma display screens 130. The purchase information is derived from the product barcode that is scanned at the checkout. A camera located at the checkout detects the purchasing customer's face and attempts to perform a match with a face recently detected at the relevant plasma display screen. If the purchasing customer's face matches that of one of the faces detected on a plasma display screen on which a relevant promotional sequence was actually viewed then a correlation between the advertisement and the purchase is logged along with the dwell time. Information from cameras that are directed towards the product shelves is also used to determine whether or not a promoted product was actually purchased by the customer associated with a face ID detected viewing the relevant plasma display screen.

The purchase/advert correlator 618 is also operable to analyse information on customer loyalty cards. A customer loyalty card is used to store information with regard to the purchasing profile and/or demographic grouping of the particular individual. Customer details stored on the loyalty card can thus be correlated with face detection/recognition information from cameras throughout the store and with information on which advertised products the customer has actually purchased. This provides an effective way of assessing the impact of advertising on an individual customer's purchasing behaviour. The correlation of the information from the checkout (including the purchased product barcode, customer facial characteristics and customer loyalty card data) with faces detected at the local display screens in this way facilitates an objective assessment of the effectiveness of the promotional displays.

Figure 7:
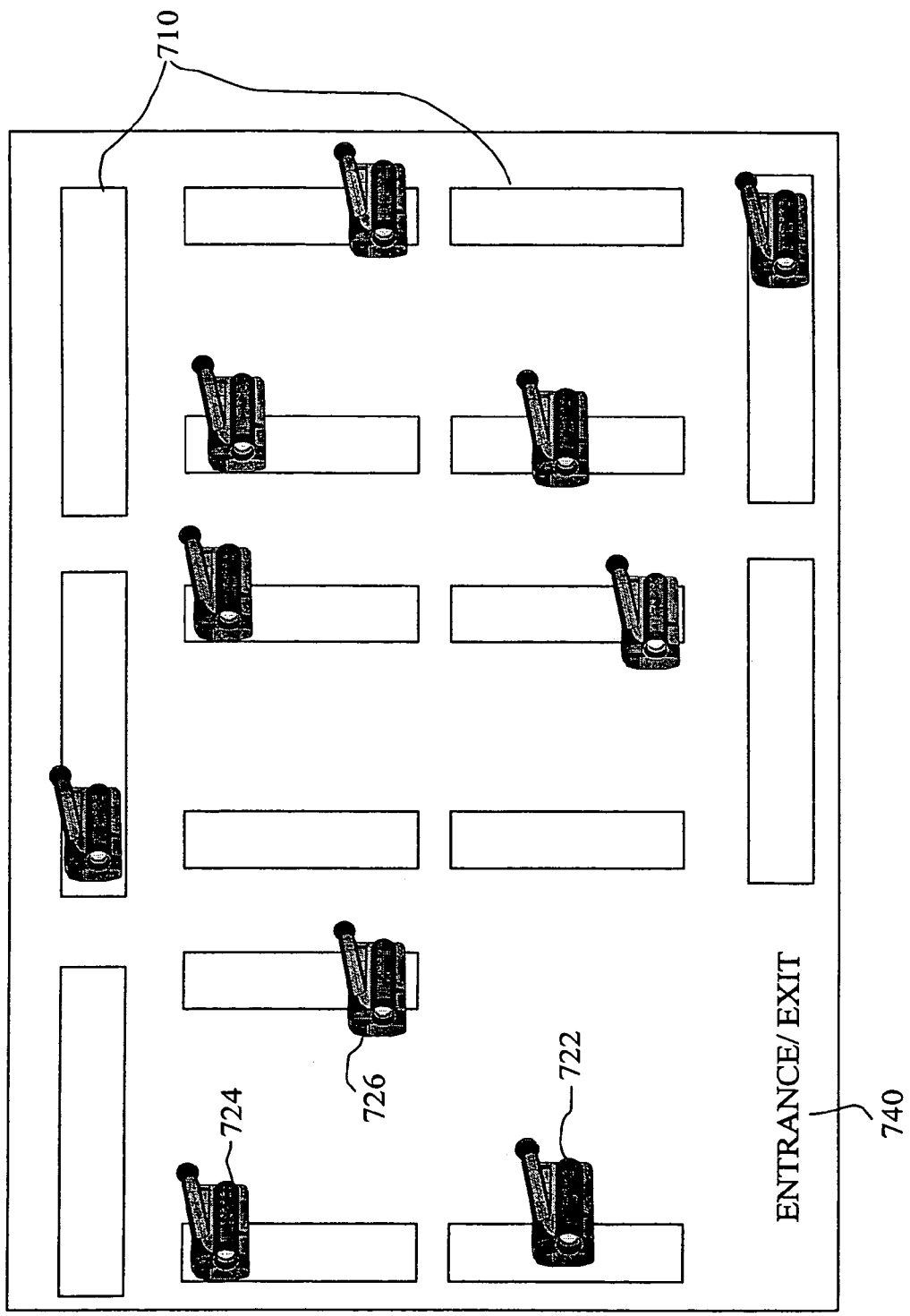
FIG. 7 schematically illustrates a store layout and the locations of a plurality of display arrangements with respect to the store layout.

FIG. 7 schematically illustrates a GUI of a store layout and the locations of a plurality of display arrangements with respect to the store layout. The regions 710 represent shelves on which products are displayed and the positions of individual display arrangements comprising display screens and associated cameras are represented by the camera icons, for example the icons 722, 724, 726. The location of each display screen in relation to the display shelves and relative to the store entrance/exit 740 is clearly indicated.

Apart from the cameras that are integral to the plasma display screens, other cameras (not shown) are also provided at the store checkouts (or indeed at other locations within the store). These checkout cameras are directed towards the purchasing customer for the purpose of detecting the customers' faces to determine whether a customer was previously detected viewing a promotional sequence on one of the plasma display screens. Furthermore, some cameras may be directed towards the goods for sale rather than towards the customer, which allows customer behaviour in terms of picking up goods from the shelf to be monitored and correlated with the face detection/recognition data from other cameras.

Figure 8:
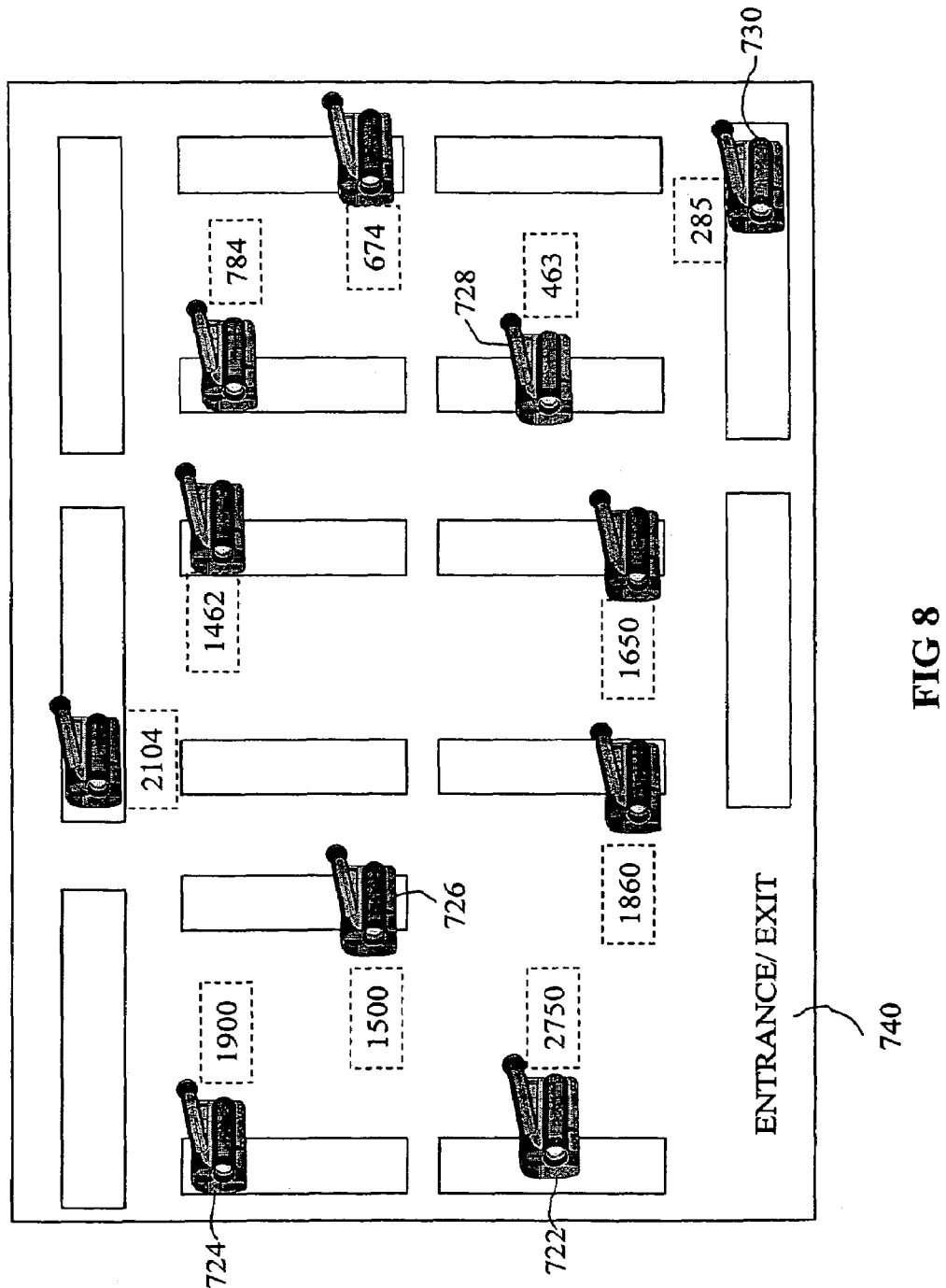
FIG. 8 schematically illustrates a global headcount statistics summary for the store and display arrangement layout of FIG. 8.

FIG. 8 schematically illustrates a global headcount statistics summary for the store and display arrangement layout of FIG. 7. It can be seen from FIG. 8 that the highest headcount of two thousand seven hundred and fifty faces occurs at the camera 722, which is located close to the store entrance/exit 740, whereas the lowest overall headcount of two-hundred and eighty five faces occurs at a camera 730, which is associated with a display screen situated in one corner of the store.

The user can access local statistics associated with each camera displayed on the GUI by selecting that camera using an input device such as a computer mouse. Each camera has a pull-down menu of associated local statistics including local headcount and dwell time. For a particular display area the headcount and dwell time will be functions of both the product on sale at the corresponding location and the promotional media being displayed at that display device. In the GUI the headcounts may be represented by colour coding e.g. by using red to identify headcount "hotspots" and blue to represent headcount "coldspots" (places with relatively low headcount) on the location map.

Figure 9:
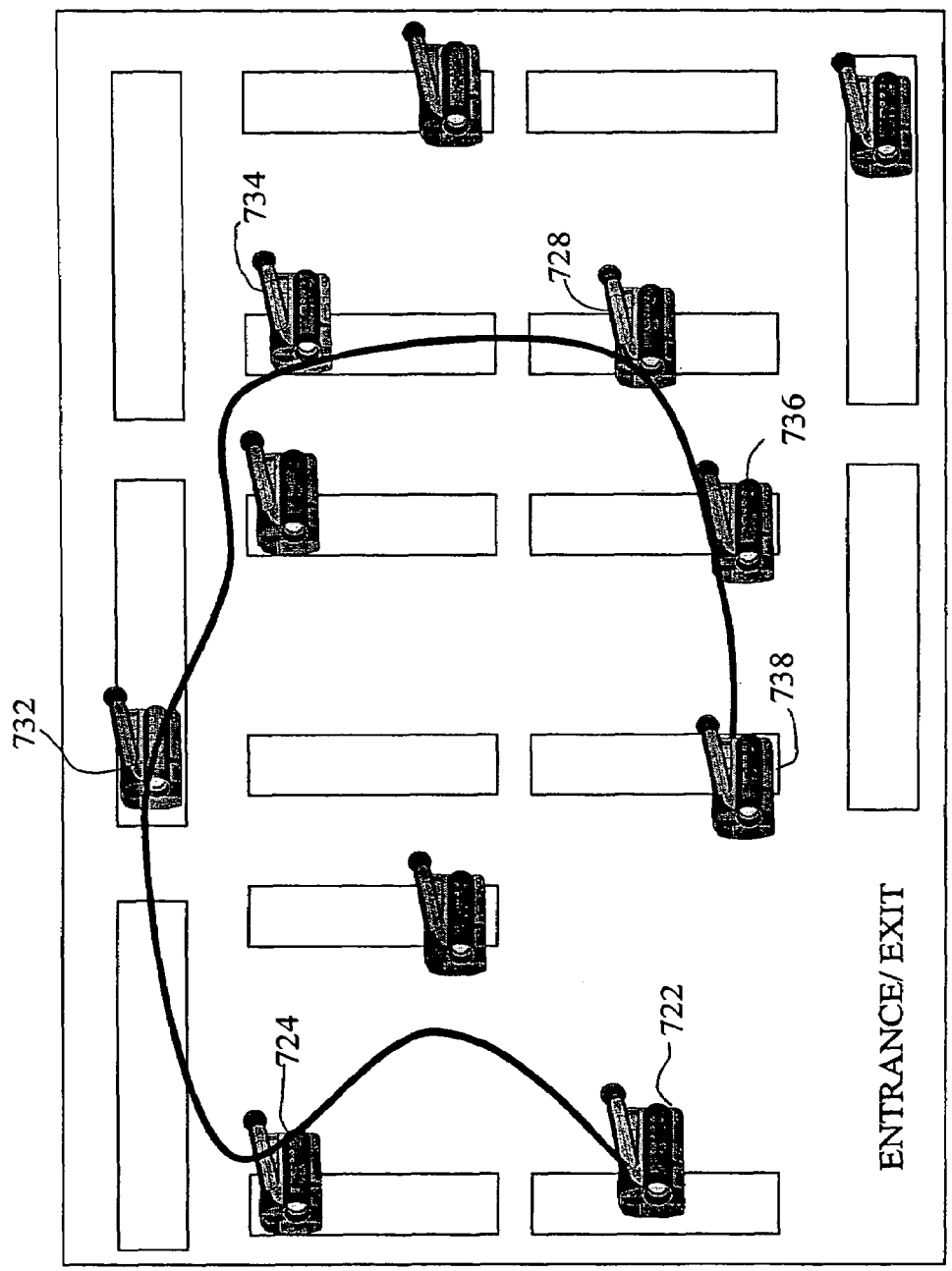
FIG. 9 schematically illustrates the most probable path followed by a customer as determined from detection and recognition of the same human face at different cameras situated at different locations in the store map of FIG. 7.

FIG. 9 schematically illustrates the most probable path followed by a customer as determined from detection and recognition of the same human face at different cameras situated at different locations in the store map of FIG. 7. The most probable path is calculated by the customer path-tracking module 616 by correlating detection times of a give global face ID at different camera locations and by repeating this analysis for a plurality of different global face IDs.

In particular, FIG. 9 shows that the most likely path taken by a customer is from camera 722 to the left of the store entrance, then to the camera 724 and subsequently a camera 732 located towards the back wall of the store, followed by cameras 734 and 728 to the right of the store, on to a camera 736 and finally a camera 738 towards the front of the store and close to the exit 740. In this case the most probable path avoids the products at the far right hand wall of the store (as viewed from the entrance). The most probable path can be detected for different times of day or subsets of detected faces corresponding to different age categories, gender categories and so on. Accordingly, retailers can derive useful information about different customer groups and their affinity to particular product display areas. The information may be used to strategically position products according to determined customer behaviour.

Figure 10:
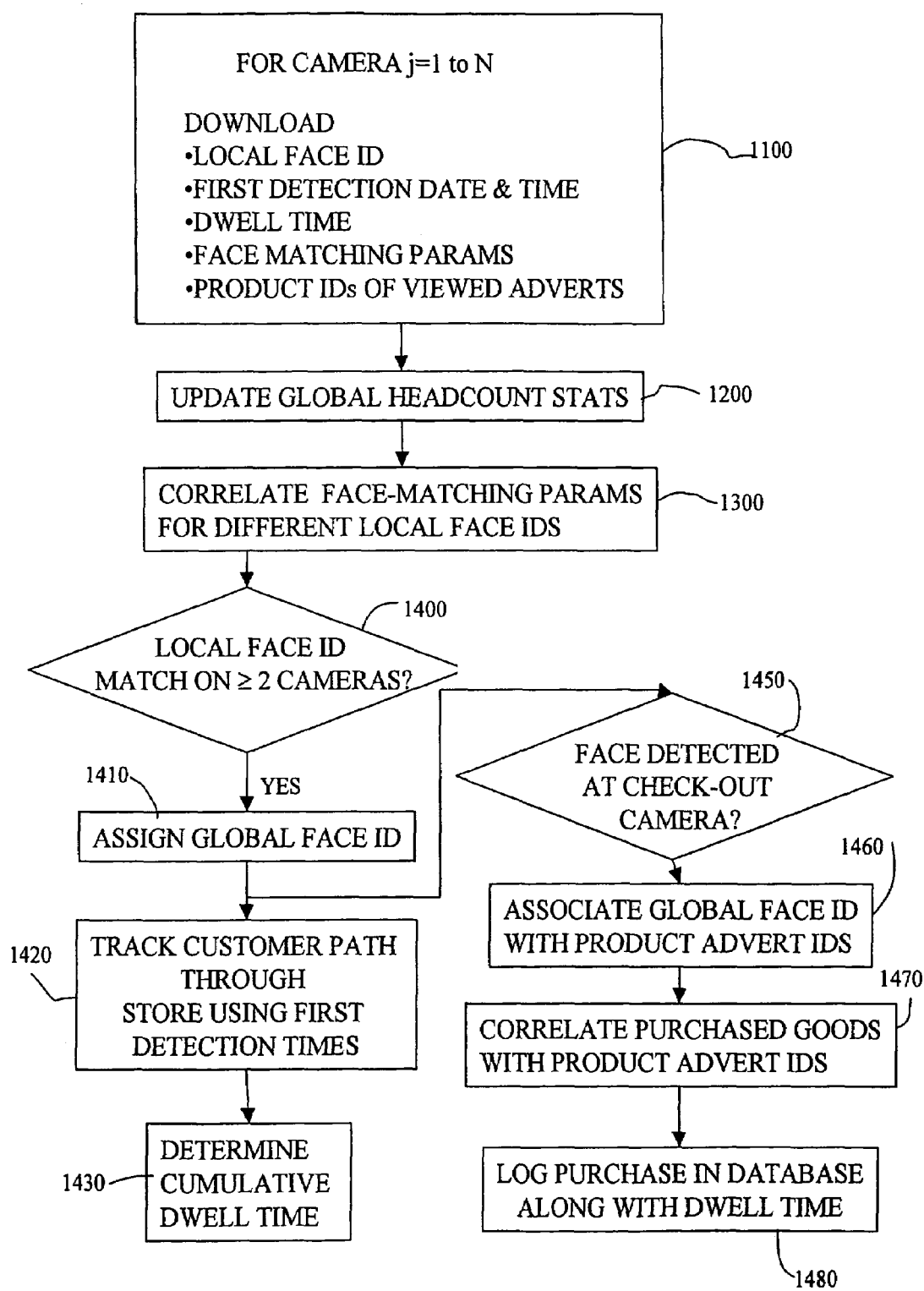
FIG. 10 is a flow chart that schematically illustrates how global statistics from a plurality of networked display devices are analysed by the control computer of FIG. 6.

FIG. 10 is a flow chart that schematically illustrates how global statistics from a plurality of networked display devices are analysed by the control computer of FIG. 6.

At a stage 1100, the control computer downloads, from the network, locally stored statistics for face detections at each of the plurality, N, of cameras situated at different locations throughout the store. The downloaded information comprises: local face IDs; dates and times of first detection for each local face ID; dwell time for each face ID at the particular camera; a set of face matching parameters used for cross-correlation of faces detected at different cameras at different times; and product IDs of adverts displayed to a customer having a given local face ID, which are used to correlate product sales with promotional sequences viewed on the plasma display screens 130.

At a stage 1200, the local headcount statistics of individual cameras are used to update the global headcount statistics (as illustrated in FIG. 8). At a stage 1300 the face-matching parameters associated with different local face IDs are correlated to determine if the same face was detected at more than one camera. At a stage 1400 it is determined whether the same face has been detected and recognised by at least two different display cameras and if so a global face ID is assigned at a stage 1410.

The process then proceeds to a stage 1420 where the path of the customer having a given global face ID is tracked between cameras at different locations in the store using the times at which the face was first detected at each camera and dwell times at individual display screens 130. At a stage 1430 a cumulative dwell time for this particular customer that includes the dwell time at every camera location at which their face was detected is calculated.

A further sequence of processing operations is performed if it is determined at a stage 1400 that a local face ID corresponds to a face detected at two or more cameras. In particular, at a stage 1450 it is determined whether one of the cameras at which the face detection was made was a camera directed to a store checkout and if so, the global face ID is associated at a stage 1460 with product advert IDs displayed at the display screen(s) at which the face corresponding to that global face ID was detected. At a stage 1470 the goods purchased by the customer at the checkout, as identified by product barcodes, are correlated with the product advert IDs and finally at a stage 1480 the correlation between purchased products and viewed adverts is logged in the statistics database 620 along with the dwell time at the display screen on which the relevant promotional advert was viewed.

The arrangements described here may enable the effectiveness of advertisements to be determined. The measure of effectiveness could be used to calculate an appropriate fee for the placement of advertisements on the display devices. Such digital signage solutions may be suitable not only for store (shop) environments but for any suitable advertising locations such as (for example) entertainment venues or railway/bus stations. Further, the techniques are not limited to advertising but may also be applied to monitoring the effectiveness of distribution and tailoring of information displayed in general. The techniques could find application in museums, schools, waiting areas etc.

Figure 11:
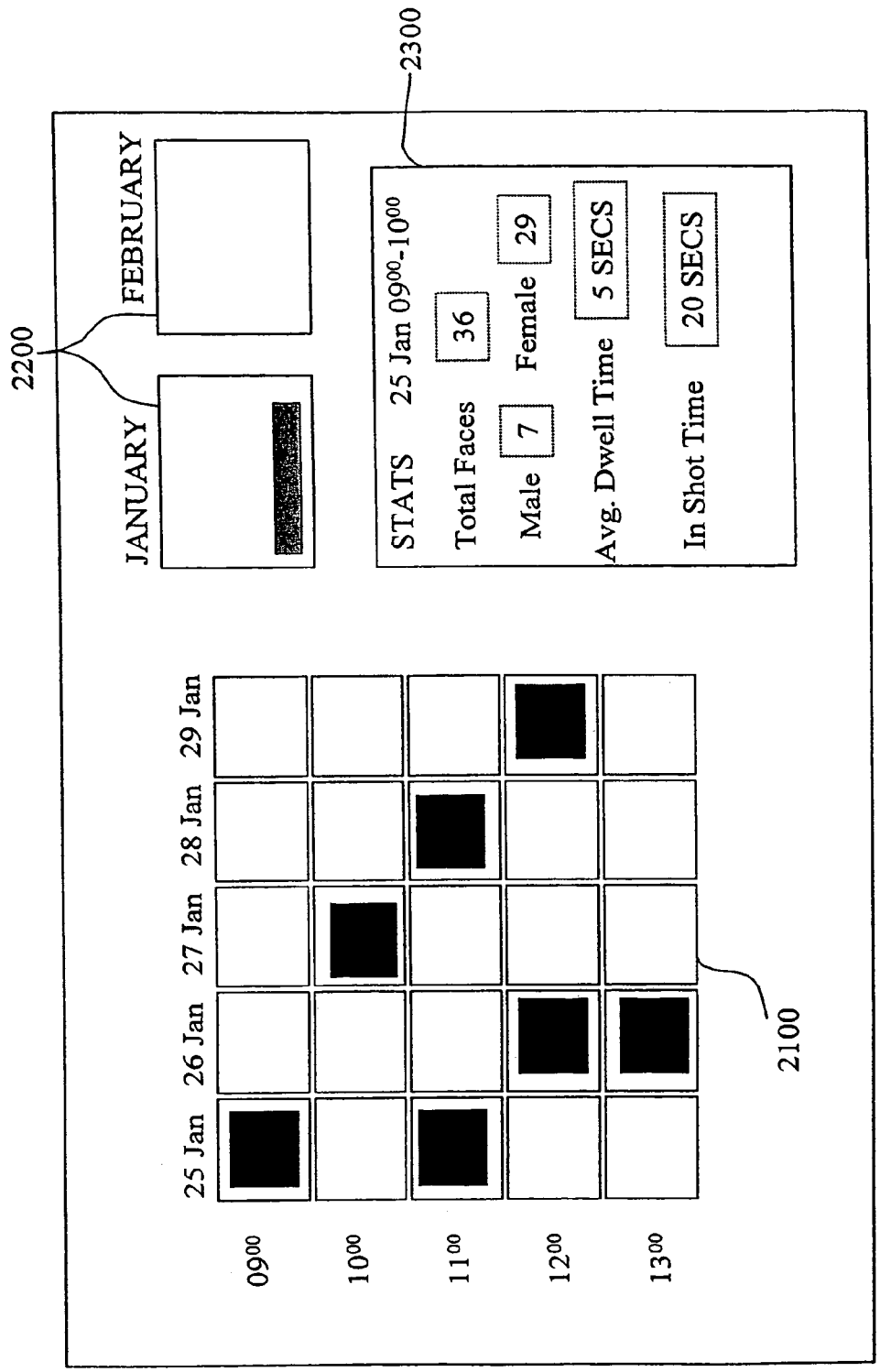
FIG. 11 schematically illustrates a graphical user interface displaying a cumulative history of global statistics from the networked display arrangements of FIG. 8.

FIG. 11 schematically illustrates a GUI displaying a cumulative history of global statistics from the networked display arrangements of FIGS. 7 to 9. The GUI comprises a time and date grid 2100 with each of five columns representing a given day and each of five rows representing a period of one hour duration. The black squares in the grid are representative keystamp images of a captured face associated with the corresponding date and time. The period of time represented by the grid can be selected via the calendar panels 2200 in the GUI. Statistics associated with a given square on the time and date grid 2100 are displayed in a window 2300.

In this example the upper left-hand box in the grid 2100 has been selected so statistics for $25^{th}$ January from $09^{00}$ am until $10^{00}$ am are presented. The statistics displayed comprise the total number of faces detected on all cameras in that time period, the breakdown of male and female faces, the average dwell time and the average in shot time.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A display system, comprising:
    an image display device having two or more sets of images for display;
    a display screen;
    a camera configured to be directed toward positions adopted by user viewing said display;
    a face detector configured to detect human faces in images captured by said camera, said face detector is configured to detect faces in at least two face categories, and to detect a dwell time respect to each detected face, the dwell time indicating a time period during which a detected face is oriented towards the display screen;
    a selector configured to select, responsive to a frequency of detection of categories of faces by said face detector with respect to one or more different periods, a set of images to be displayed on said image display device at that period, wherein said selector is responsive to face category frequency data detected during a corresponding previous period, said previous period being a predetermined time interval; and
    a statistical analyzer configured to determine a frequency of detection of categories of faces in at least one of an age or a gender category over the predetermined time interval, wherein
    the selector is further configured to select a promotional display sequence stored on a data storage device and including advertising images for products or services, based on a relative frequency of detected faces in each of a different category.

2. A display system according to claim 1, wherein said sets of images comprise advertising images.

3. A display system according to claim 1, wherein said categories comprise two or more age categories.

4. a display system according to claim 1, wherein said categories comprise gender categories.

5. A display system according to claim 1, wherein said categories comprises two or more facial expression categories.

6. A display system according to claim 5, further comprising:
    a memory configured to store data indicating said viewers' facial expression category with respect to each set of images.

7. A display system according to claim 1, wherein said selector is configured to select a set of images in dependence on a cumulative dwell time for faces in each category.

8. A display system according to claim 1, wherein said face detector is configured to detect a time for which a detected face is not directed towards said display screen.

9. A display system according to claim 1, wherein said image display device includes at least an idle mode and an active mode, said image display device being coupled to said face detector such that said image display device changes from said active mode to said idle mode if no faces are detected for at least a predetermined time, and said image display device changes from said idle mode to the active mode in response to detection of a face.

10. A display system according to claim 9, wherein said idle mode is a power-saving mode.

11. A display system according to claim 1, wherein said selector is responsive to face category frequency data detected during that period.

12. A display system according to claim 1, wherein said corresponding previous period is a period at substantially the same time of day as on a previous day.

13. A display method for a display system, comprising:
  capturing images, on an image display device of the display system, of users viewing an image display device;
  detecting human faces in said captured images, with a face detector of the display system, said faces being detected in at least two face categories, and detecting a dwell time with respect to each detected face, the dwell time indicating a time period during which a detected face is oriented towards a display screen;
  selecting a set of images to be displayed on said image display device with respect to one or more different periods in response to a frequency of detection of categories of faces by said face detector at those periods, wherein said selecting is responsive to face category frequency data detected during a corresponding previous period, said previous period being a predetermined time interval; and
  determining a frequency of detection of categories of faces in at least one of an age or a gender category over the predetermined time interval, wherein
  the selecting includes selecting a promotional display sequence stored on a data storage device and including advertising images for products or services, based on a relative frequency of detected faces in each of a different category.

14. A computer readable storage medium encoded with a computer readable program configured to cause an information processing apparatus to execute the method according to claim 13.

15. A display system, comprising:
  an image display device having two or more sets of images for display;
  a display screen;
  a camera configured to be directed towards positions adopted by users viewing said display;
  face detector means for detecting human faces in images captured by said camera, said face detector detects faces in at least two face categories, and for detecting a dwell time with respect to each detected face, the dwell time indicating a time period during which a detected face is oriented towards the display screen;
  selector means for selecting, responsive to a frequency of detection of categories of faces by said face detector with respect to one or more different periods, a set of images to be displayed on said image display device at that period, wherein said selector is responsive to face category frequency data detected during a corresponding previous period, said previous period being a predetermined time interval; and
  a statistical analyzer configured to determine a frequency of detection of categories of faces in at least one of an age or a gender category over the predetermined time interval, wherein
  the selector means selects a promotional display sequence stored on a data storage device and including advertising images for products or services, based on a relative frequency of detected faces in each of a different category.

* * * * *